United States Patent [19]

Masui et al.

[11] Patent Number: 5,122,320
[45] Date of Patent: Jun. 16, 1992

[54] PROCESS FOR PRODUCING A MULTILAYER ARTICLE

[75] Inventors: Shohei Masui, Aichi; Masahito Matsumoto, Osaka; Nobuhiro Usui, Osaka; Toshihiro Hosokawa, Osaka; Ryuichi Ishitsubo, Osaka, all of Japan

[73] Assignees: Sumitomo Chemical Co., Ltd.; Hosokawa Seisakusho Co., Ltd., Osaka, Japan

[21] Appl. No.: 456,943

[22] Filed: Dec. 26, 1989

[30] Foreign Application Priority Data

Dec. 27, 1988 [JP] Japan ................. 63-334087

[51] Int. Cl.$^5$ ............. B29C 33/10; B29C 43/20; B32B 27/08; B32B 27/12
[52] U.S. Cl. .................. 264/155; 264/156; 264/257; 264/266; 264/337
[58] Field of Search ........... 264/102, 154, 155, 259, 264/337, 257, 258, 156, 266

[56] References Cited

U.S. PATENT DOCUMENTS 3,045,284  7/1962  Peras .
3,822,857  7/1974  Tanie .
4,431,331  3/1969  Pincus et al. .............. 264/338 X
4,560,523  12/1985 Plumley et al. ............. 264/102
4,562,026  12/1985 Mosher .
4,657,717  4/1987  Cattanach et al. ........... 264/102
4,740,346  4/1988  Freeman .................. 264/102 X

FOREIGN PATENT DOCUMENTS 2237668  7/1972  Fed. Rep. of Germany .
2168787  8/1973  France .
2329434  5/1977  France .
2439525  5/1980  France .
59-150740 8/1984  Japan .
2155392  9/1985  United Kingdom .

OTHER PUBLICATIONS

Patent Abstracts of Japan, vol. 7, No. 153 (M-226) 1298, 5th Jul. 1983; JP-A-58 062 028 (Akiresu) Apr. 13, 1983.

Primary Examiner—Leo B. Tentoni

[57] ABSTRACT

A multilayer molded article including a resin body and a skin material having little or no wrinkles or breakage in the skin material is molded by molding a resin melt and the skin material in the mold while removing the air trapped between the skin material and the mold.

35 Claims, 8 Drawing Sheets

PROCESS FOR PRODUCING A MULTILAYER ARTICLE

BACKGROUND OF THE INVENTION

1. Field of the Invention

The present invention relates to a process and a mold for producing a multilayer molded article having good appearance with no wrinkles or breakage of a skin material.

2. Description of the Related Art

Resin molded articles are widely used in many products including automobiles and household electric appliances, since such molded articles are economical and light and have good moldability.

Since the resin molded articles have some drawbacks such that they have poor appearance or cool feeling and that they are easily flawed, it is desired to provide resin molded articles having good surface properties such as better decoration and soft feeling properties.

Although many attempts have been made to provide such desirable resin molded articles, it is impossible for a single kind of resin to have satisfactory moldability and strength and also to provide a molded article having good surface properties.

Then, presently, at least two materials having different functions are composited to produce a multilayer molded article comprising a resin body and a skin material.

As a method for producing the multilayer molded article, there are proposed a method comprising adhering the skin material to the resin body with an adhesive and a method comprising providing a resin melt and the skin material in a cavity formed in a mold consisting of male and female molds and closing the male and female molds whereby the molding of the resin and covering with the skin material are simultaneously accomplished.

However, by the first method, it is very difficult to adhere the skin material on the molded article having a complicated structure without causing wrinkles of the skin material.

In the second method, the air trapped between the skin material and the mold is compressed by the mold closing action, whereby the skin material is wrinkled as shown in FIG. 1A, or the shape is deformed as shown in FIG. 1B since the resin melt is not sufficiently filled, or the skin material is broken so that the resin flows out as shown in FIG. 1C. Therefore, molded articles having little or no commercial value tend to be produced.

SUMMARY OF THE PRESENT INVENTION

One object of the present invention is to provide a process for producing a multilayer molded article comprising a resin body and a skin material having no or few wrinkle or breakage in the skin material.

Another object of the present invention is to provide a mold which is suitable for practicing the method for producing the multilayer molded article according to the present invention.

According to a first aspect of the present invention, there is provided a process for producing a multilayer molded article comprising a resin body and a skin material, which process comprising steps of:

supplying the skin material between a male mold and a female mold, supplying a resin melt between the skin material and one of the male and female molds, and closing the molds to mold the resin melt while removing the air trapped between the skin material and at least one of the molds.

According to a second aspect of the present invention, there is provided a mold for molding a multilayer molded article comprising a resin body and a skin material, which mold comprises a male mold and a female mold, wherein a heat-resistant porous member is embedded in at least a part of an inner wall of at least one of the male and female molds.

According to a third aspect of the present invention, there is provided a mold for molding a multilayer molded article comprising a resin body and a skin material, which mold comprises a male mold and a female mold, wherein a slit is provided on an inner wall of at least one of the male and female molds.

According to a fourth aspect of the present invention, there is provided a mold for molding a multilayer molded article comprising a resin body and a skin material, which mold comprises a male mold and a female mold, wherein a hole is provided on an inner surface of at least one of the male and female molds which contacts the skin material.

DETAILED DESCRIPTION OF THE DRAWINGS

In the figures, a mold 1 comprises a female mold 2 and a male mold 3, and in the following description, the male mold 3 is fixed and the female mold is moved vertically with a well known lifting mechanism (not shown).

Figure 1A:
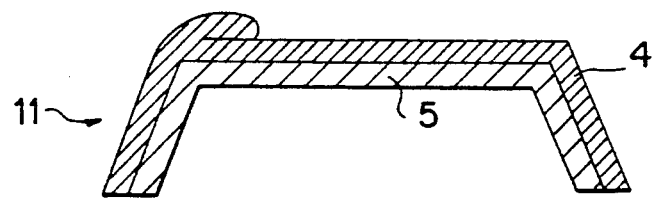
FIGS. 1A, 1B and 1C show defects of the multilayer molded articles produced by the conventional methods, FIGS. 2A, 2B and 2C schematically show an embodiment of the process for producing a multilayer molded article according to the present invention, FIGS. 3A through 3E schematically show some embodiments of the molds for producing a multilayer molded article according to the present invention, FIGS. 4A through 4D schematically show a second embodiment of the process for producing a multilayer molded article according to the present invention, and FIGS. 5A through 5D schematically show a third embodiment of the process for producing a multilayer molded article according to the present invention.
Figure 1B:
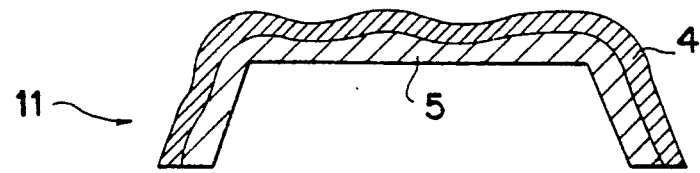
Figure 1C:
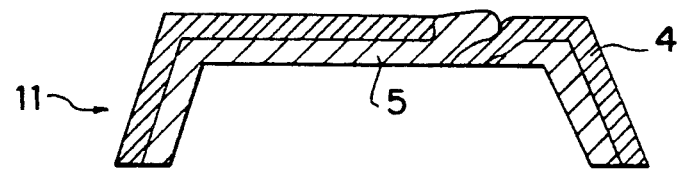
Figure 2A:
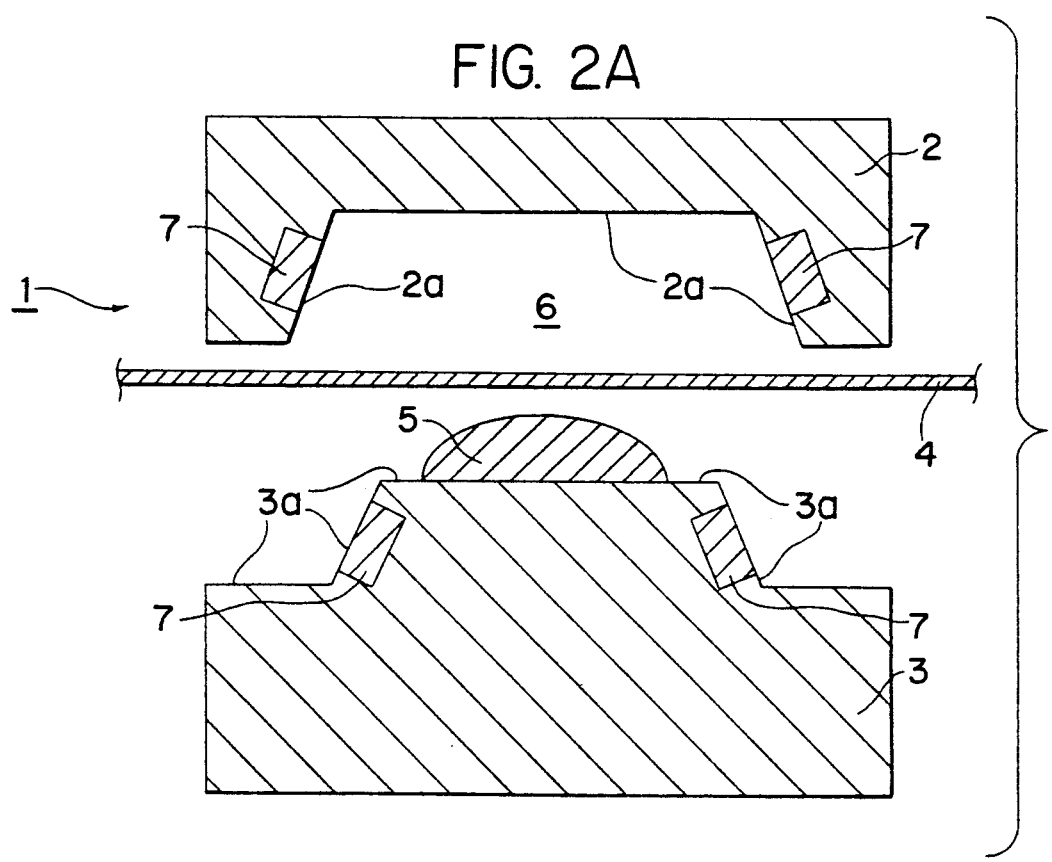
Figure 2B:
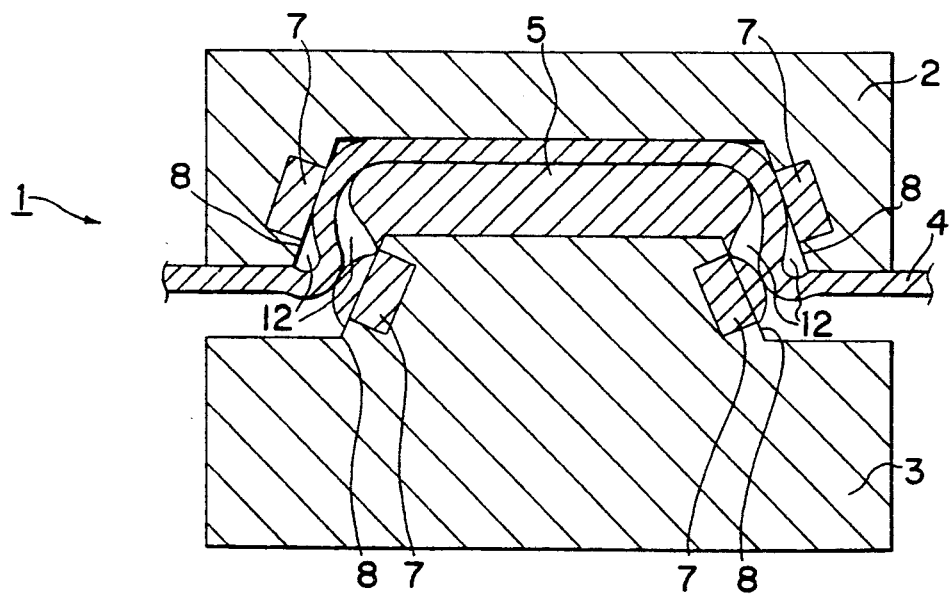
Figure 2C:
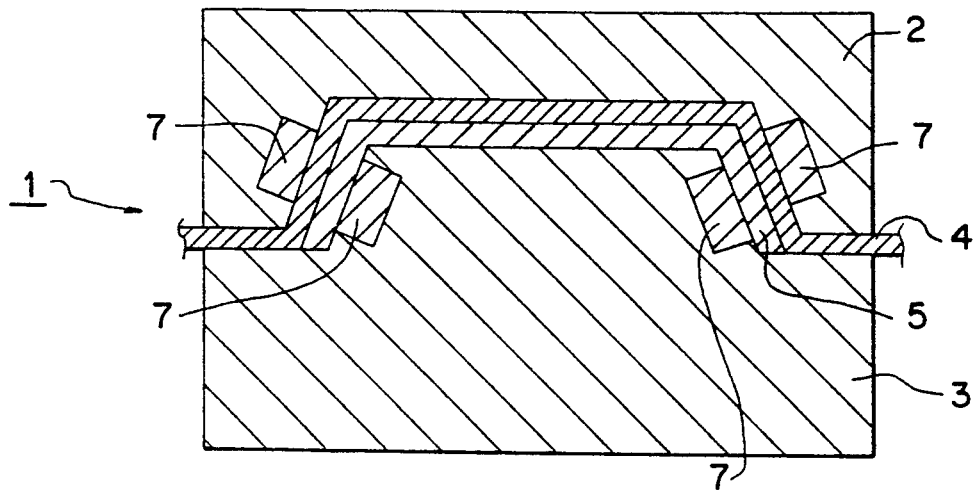

In FIGS. 2A, 2B, 2C, each of the male and female molds has heat-resistant porous members 7 embedded in a wall part 2a and 3a facing the cavity 6 of the mold. The heat-resistant porous member can be produced from sintered metal, ceramics and the like.

In FIGS. 2A, 2B, 2C, the heat-resistant porous members are embedded in a part of the inner surface, although they cover the whole area of one or both of the surfaces facing the cavity 6. The heat-resistant porous members should be present at least at parts 8 of the mold where a front line of the resin melt finally reaches during molding or where a weld line is formed when the resin melt is supplied from two or more conduits. Such front line and weld line will be referred to as "front edge line" of the resin melt.

The part of the mold which contacts the front edge line of the resin melt directly or through the skin material depends on designs of the molds, and parts where the heat-resistant porous members 7 are embedded are selected depending on the kinds of molds.

Figure 3A:
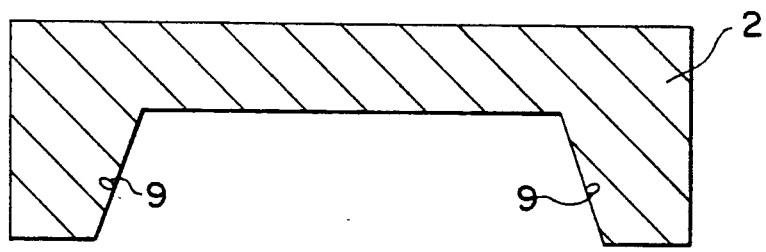
Figure 3B:
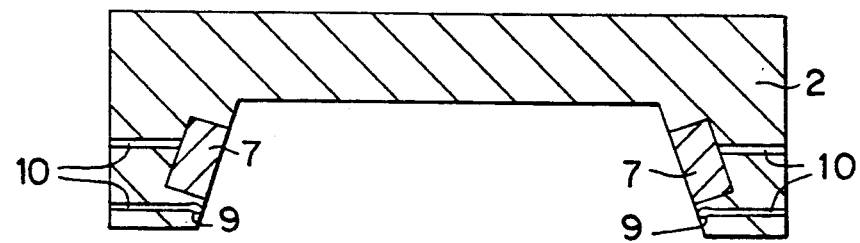

In place of or in addition to the heat-resistant porous members, slits 9 are provided on the inner surfaces of the male and female molds as shown in FIGS. 3A and 3B. Preferably, each slit 9 has a width of from 0.05 to 1 mm.

As shown in FIG. 3B, a through hole 10 communicates with the heat-resistant porous member 7 and/or the slit 9. The through hole 10 connects the heat-resistant member 7 or the slit and the exterior. When the air is trapped in a larger amount, the through hole is preferably provided to remove the air quickly.

Further, an outlet opening of the through hole 10 can be connected to suction means such as a suction pump.

For example, the multilayer molded article is produced by using the mold of FIG. 2A, 2B, 2C, 3A or 3B as follows:

(1) First, the skin material 4 is provided between the female mold 2 and the male mold 3.

(2) A mass of resin melt 5 is supplied between the skin material and one of the male and female molds. In FIG. 2A, the resin melt is supplied on the male mold 3 below the skin material 4.

The resin melt can be supplied by a per se conventional means. For example, the resin melt is supplied through a resin supplying conduit which is formed in the mold (not shown) with means for melting and plasticizing the resin such as an extruder (not shown).

(3) By actuating the lifting mechanism, the female mold is lowered to press the skin material and then the resin melt, whereby the resin melt flows and spreads between the skin material 4 and the surface of the male mold 3. Simultaneously, the skin material is pressed against the inner wall of the female mold.

The air trapped between the skin material and the female mold and between the skin material and the male mold is gathered near the front edge lines of the resin melt (cf. FIG. 2B).

(4) As the female mold is further lowered, the trapped air 12 escapes through the heat-resistant porous members 7 and/or the slits 9, whereby the skin material and the resin melt contact each other intimately. Finally, the male and female molds are completely closed and the molding of the resin is finished to obtain a multilayer resin molded article comprising the resin body and the skin material.

Figure 3C:
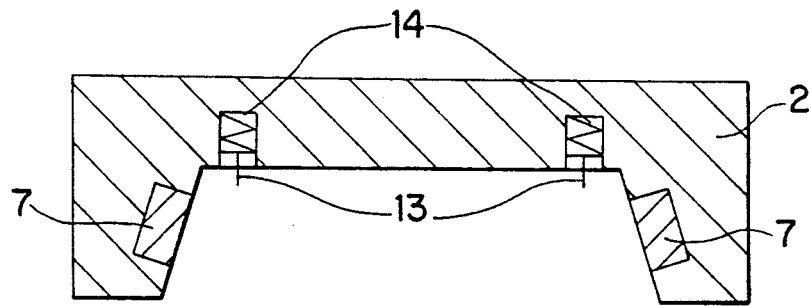
Figure 3D:
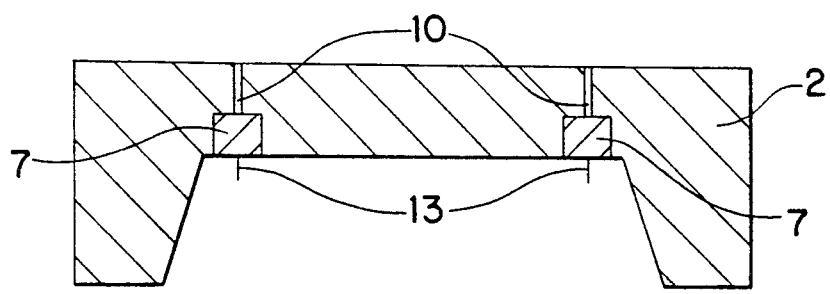
Figure 3E:
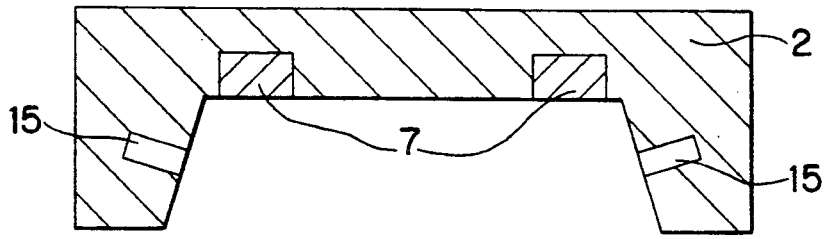

FIGS. 3C, 3D and 3E show cross sections of other embodiments of the female mold of the present invention.

The same numerals indicated the same parts as in FIGS. 2A, 2B, 2C, 3A and 3B.

In the embodiment of FIG. 3C, the mold has pins 13 on the inner wall of the mold which directly contacts the skin material. Further, the pin may be provided on the heat-resistant porous member 7 as shown in FIG. 3D.

The pins 13 can be provided as independent parts on the molds 2 and/or 3, or integrally formed with the molds 2 and/or 3.

Alternatively, each pin 13 may be movably attached to an expansion means such as a spring 14 (e.g. a steel spring, a polyurethane spring, etc.) as shown in FIG. 3C or a cushioning means such as a hydraulic cylinder and an oil cylinder.

The pin preferably has a diameter of 0.1 to 2 mm.

The pin is provided at a part of the inner wall of the mold which corresponds to a part of the skin material where it is easily wrinkled or where the pin hole is inconspicuous in the final use.

The length of the pin which extends beyond the inner wall surface level varies with the thickness of the skin material.

By making reference to FIG. 4A through 4D, the production of the multilayer molded article by using the mold of FIGS. 3C or 3D is explained:

(1) First, the skin material 4 is provided between the female mold 2 and the male mold 3.

Figure 4A:
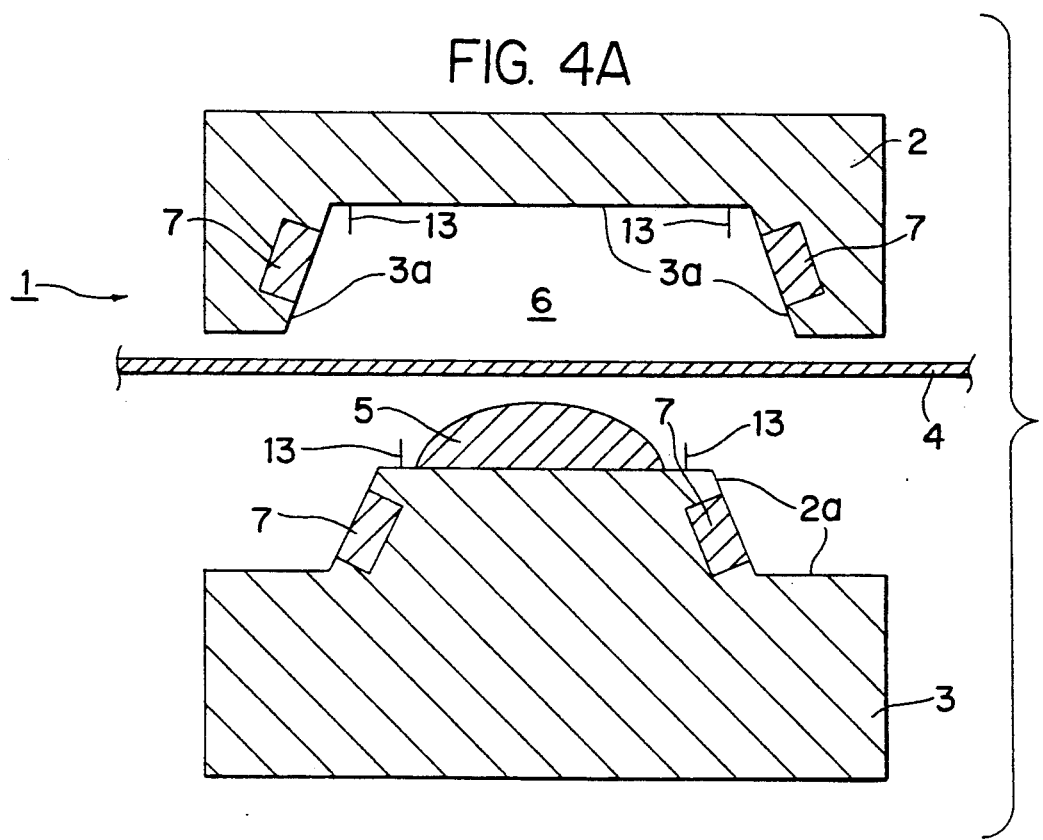

(2) A mass of resin melt 5 is supplied between the skin material 4 and one of the male and female molds. Preferably, the resin melt is supplied on the male mold 3 below the skin material 4 (FIG. 4A).

(3) By actuating the lifting mechanism, the female mold 2 is lowered to press skin material and then the mass of resin melt, whereby the resin melt flows and spreads between the skin material 4 and the surface of the male mold 3. Simultaneously, the skin material is pressed against the inner wall of the female mold.

Figure 4B:
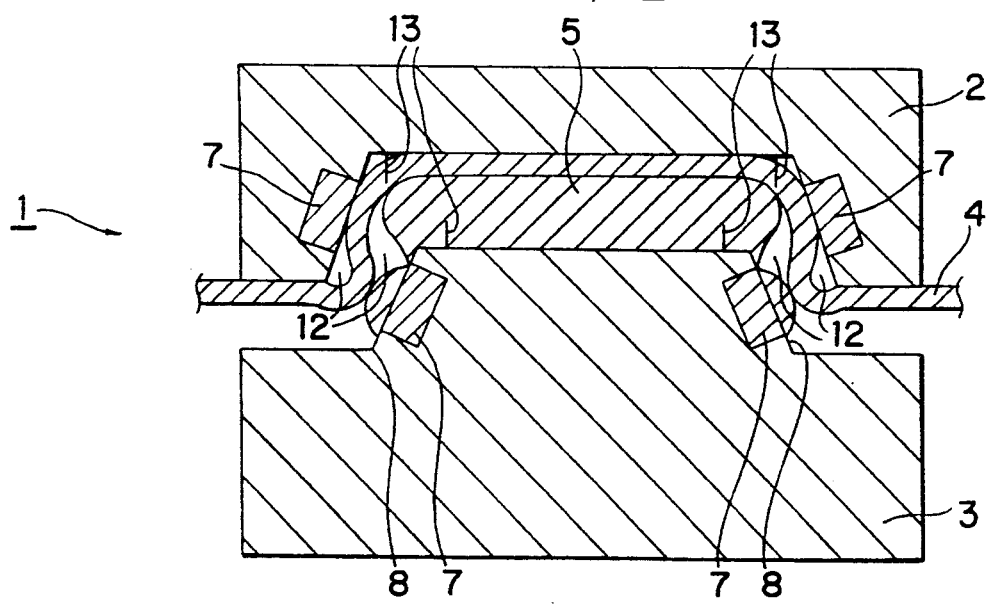
Figure 4C:
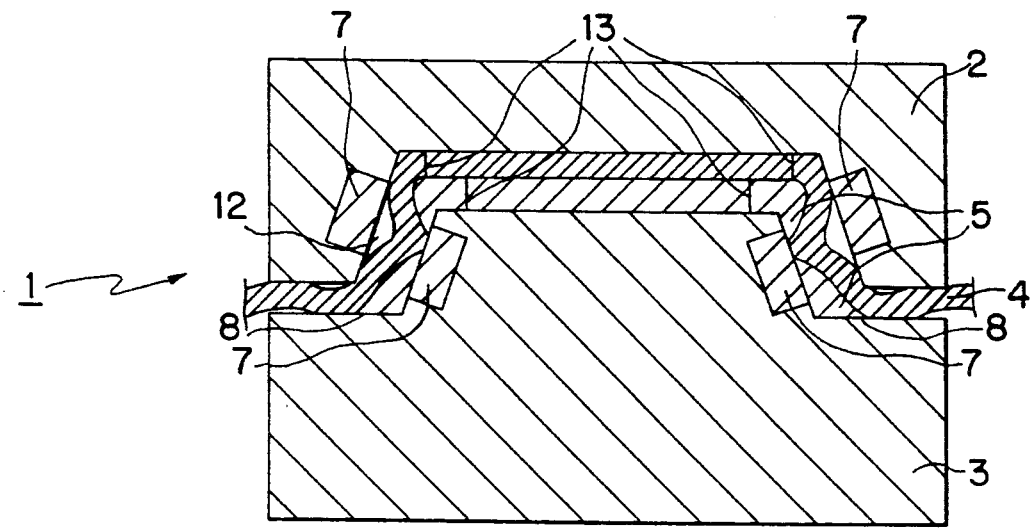

The air trapped between the skin material and the male mold and between the skin material and the female mold is gathered near the front edge lines of the resin melt (cf. FIG. 4B).

(4) As the female mold is further lowered, pin holes are made in the skin material with the pins 13, and the trapped air 12 escapes through the pin holes formed in the skin material, whereby the skin material and the resin melt contact each other intimately. In this step, the resin melt does not flow out through the pin holes, since each pin hole has a very small pore and the resin melt is viscous enough not to flow through the pin hole (cf. FIG. 4C).

Figure 4D:
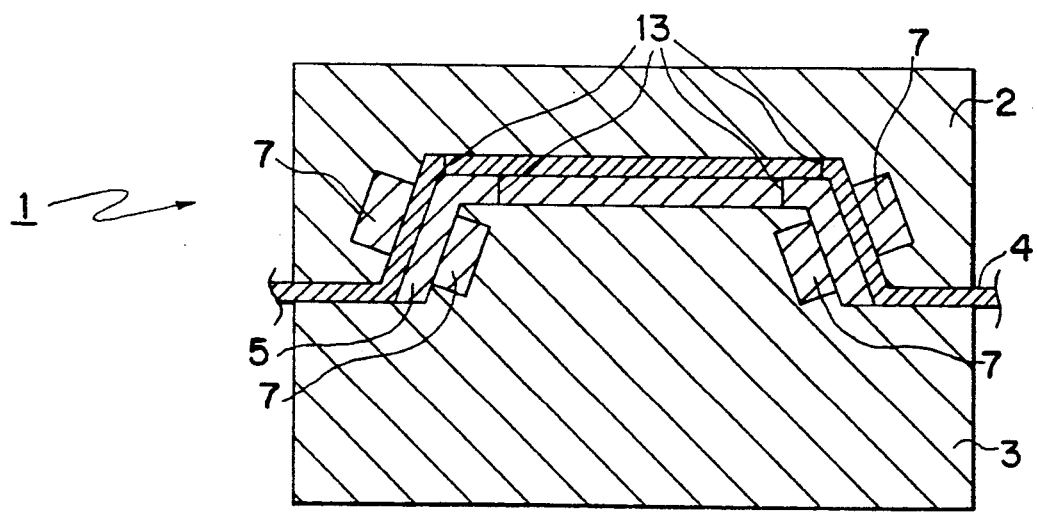

Finally, the male and female molds are completely closed and the molding of the resin is finished to obtain a multilayer resin molded article comprising the resin body and the skin material (cf. FIG. 4D).

FIGS. 5A through 5D schematically show the production of the multilayer molded resin article by using a further embodiment of the mold according to the present invention.

In this embodiment, the mold has at least one small hole 15 on the inner wall 2a of the mold 2 which directly contacts the skin material 4 as shown in FIG. 5.

Preferably, the small hole has a diameter of 2 to 6 mm and a depth of 11 to 30 mm.

The hole is provided at a part of the inner wall of the mold which directly contacts a part of the skin material, particularly a part of the mold inner wall which corresponds to a part of the skin material where it is easily wrinkled or where punctured holes are inconspicuous in the final use.

If the number of the holes is more than required or the holes are provided at parts where the puncture is not required, the resin melt flows out through the punctured parts made with the holes.

The hole may be formed across the wall of the mold to communicate with the exterior atmosphere.

The hole 15 may be combined with the heat-resistant porous member as shown in FIG. 3E.

The production of the multilayer molded article by using the mold having the holes is explained by making reference to FIGS. 5A through 5D:

(1) First, the skin material 4 is provided between the female mold 2 and the male mold 3.

(2) A mass of resin melt 5 is supplied between the skin material and one of the male and female molds. Preferably, the resin melt is supplied on the male mold 3 below the skin material 4 (FIG. 5B).

(3) By actuating the lifting mechanism, the female mold is lowered to press the mass of skin material and then the resin melt, whereby the resin melt flows and spreads between the skin material 4 and the surface of the male mold 3. Simultaneously, the skin material is pressed against the inner wall of the female mold.

Figure 5A:
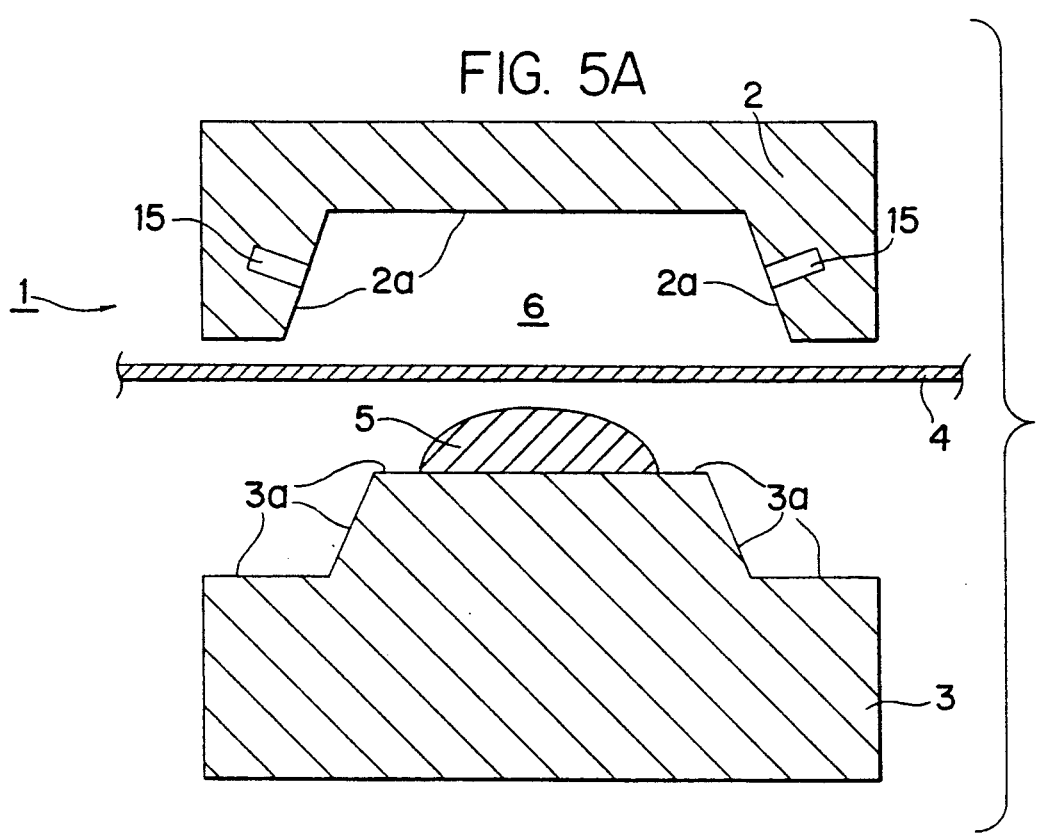
Figure 5B:
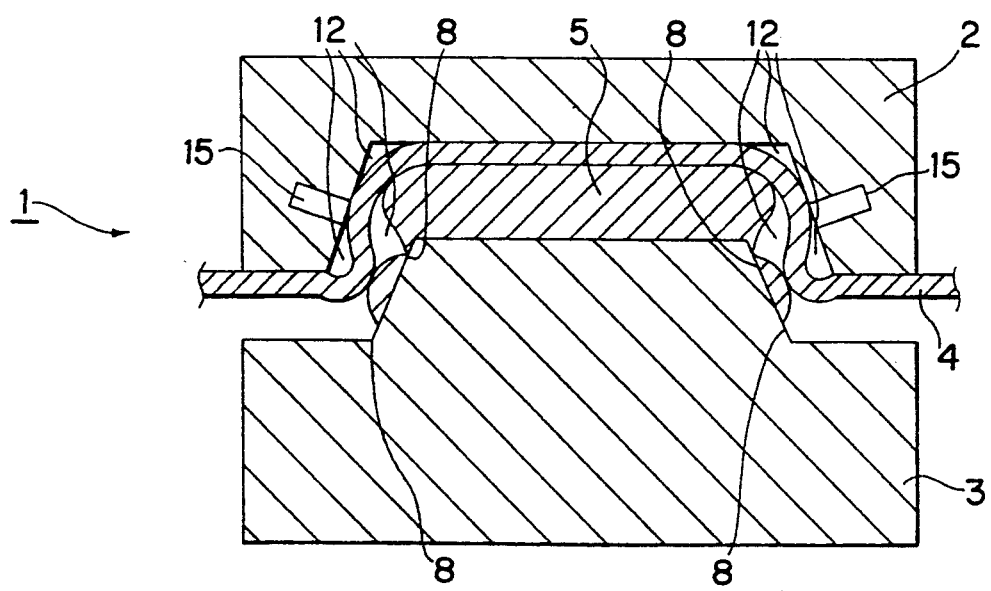
Figure 5C:
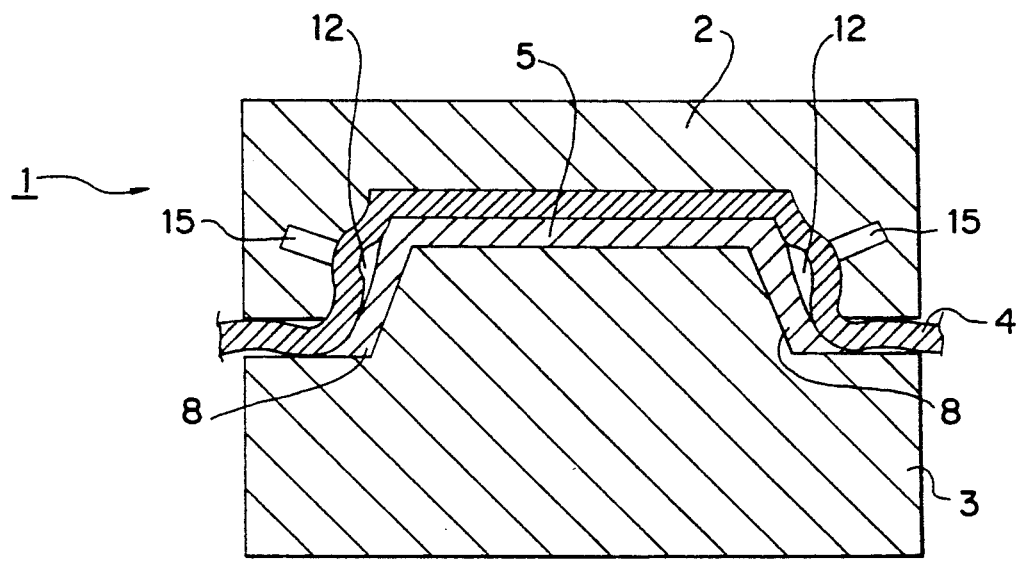
Figure 5D:
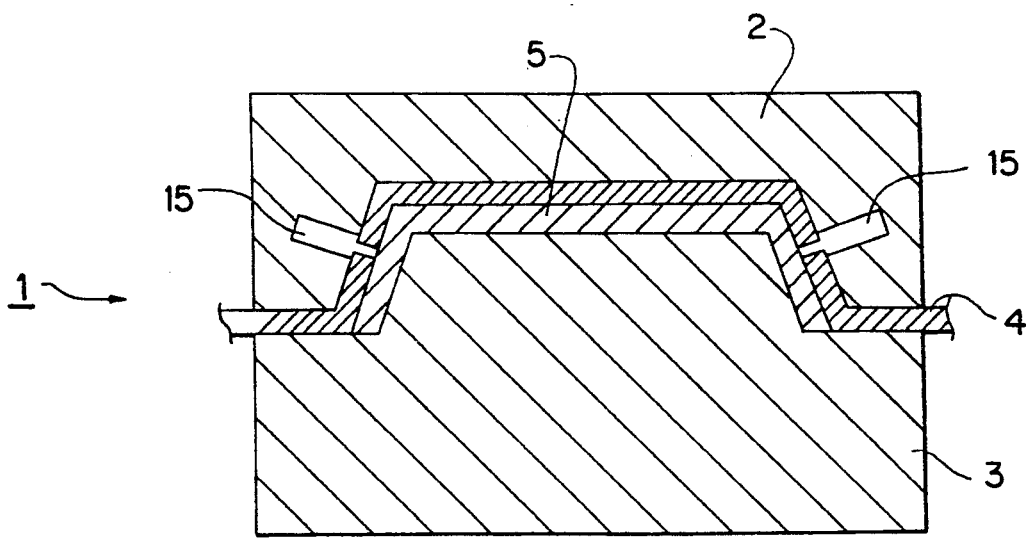

The air trapped between the skin material and the male mold and between the skin material and the female mold is gathered near the front edge lines of the resin melt (cf. FIG. 5B).

(4) As the female mold is further lowered, the trapped air 12 is further compressed and punctures the skin material at the position of the hole, whereby the skin material and the resin melt contact each other intimately. Finally, the male and female molds are completely closed and the molding of the resin is finished to obtain a multilayer resin molded article comprising the resin body and the skin material.

In the process of the present invention, the timing of the resin melt supply is not limited to the above described timing. The resin melt can be supplied at any time before the male and female molds are completely closed.

The resin melt can be supplied between the skin material and either of the male and female molds. Therefore, the present process can be applied for inner lining and outer lining.

The relative position of the male and female molds and the closing direction can be freely selected.

Specific examples of the skin material are woven or non-woven fabric, nets made of metals, fibers or thermoplastic resins, paper, metal foils, and a sheet or a film of a thermoplastic resin or elastomer. The skin material may be decorated with uneven patterns such as grain patterns, printing, dying and the like. In addition, the skin material may be made of foamed materials of thermoplastic resins or rubbers. Also, a laminate comprising at least two layers each made of the same material or different materials which are bonded to each other with an adhesive can be used as the skin material. Before the skin material is supplied in the mold, a part or whole of the skin material may be preheated to adjust tensile stress and elongation.

As the resin to be molded by the process of the present invention, any of the conventional resins used in compression molding, injection molding and extrusion molding can be used. Specific examples of the resin are non-expandable or expandable resins of thermoplastic resins (e.g. polypropylene, polyethylene, polystyrene, acrylonitrile-styrene-butadiene copolymer, nylon, etc.), and thermoplastic elastomers (e.g. ethylene-propylene copolymer, styrene-butadiene copolymer, etc.). The resin may contain at least one additive such as fillers (e.g. inorganic fillers and glass fibers), pigments, lubricants, antistatic agents and the like.

What is claimed is:

1. A process for producing a multilayer molded article comprising a resin body and a skin material, which process comprises the steps of:
   supplying skin material between a male mold and a female mold,
   supplying a resin melt between the skin material and one of the male and female molds, and
   closing the molds to mold the resin melt while removing any air trapped between the skin material and at least one of the molds at a front edge line of the resin melt, wherein the air is removed through a pin hole made in the skin, through a puncture made in the skin, through a slit formed on an inner wall of at least one of the molds, or through a heat-resistant porous member embedded in an inner wall of at least one of the molds.

2. A process for producing a multilayer molded article comprising a resin body and a skin material, which process comprises the steps of:
   supplying skin material between a male mold and a female mold,
   supplying a resin melt between the skin material and one of the male and female molds, and
   closing the molds to mold the resin melt while removing any air trapped between the skin material and at least one of the molds at a front edge line of the resin melt, wherein the air is removed through a heat-resistant porous member embedded in an inner wall of at least one of the molds and a slit formed in an inner wall of at least one of the molds.

3. A process for producing a multilayer molded article comprising a resin body and a skin material, which process comprises the steps of:
   supplying skin material between a male mold and a female mold,
   supplying a resin melt between the skin material and one of the male and female molds, and
   closing the molds to mold the resin melt while removing any air trapped between the skin material and at least one of the molds at a front edge line of the resin melt, wherein the air is removed through a pin hole made in the skin by a pin affixed on an inner wall of at least one of the molds and through a heat-resistant porous member embedded in an inner wall of at least one of the molds and a slit formed in an inner wall of at least one of the molds.

4. A process for producing a multilayer molded article comprising a resin body and a skin material, which process comprises the steps of:
   supplying skin material between a male mold and a female mold, supplying a resin melt between the skin material and one of the male and female molds, and
   closing the molds to mold the resin melt while removing any air trapped between the skin material and at least one of the molds at a front edge line of the resin melt, wherein the air if removed through a puncture made in the skin adjacent to a mold hole formed on an inner wall of at least one of the walls and through a heat-resistant porous member embedded in at least one of the molds and a slit formed on an inner wall of at least one of the molds.

5. The process according to claim 1, wherein the trapped air is removed through a slit formed on an inner wall of at least one of the molds.

6. The process according to claim 1, wherein the trapped air is removed through a pin hole made in the skin by a pin affixed on an inner wall of at least one of the molds.

7. The process according to claim 6, wherein said pin is attached to a spring or cushioning means.

8. The process according to claim 6, wherein said pin has a diameter of 0.1 to 2 mm.

9. The process according to claim 1, wherein the trapped air is removed through a puncture made in the skin adjacent to a mold hole formed in an inner wall of at least one of the molds.

10. The process according to claim 9, wherein said mold hole formed in at least one of the molds has a diameter of 2 to 6 mm and a depth of 11 to 30 mm.

11. The process according to claim 6, wherein a through hole is formed in at least one of the molds so as to communicate with said pin.

12. The process according to claim 9, wherein a through hole is formed in at least one of the molds so as to communicate with mold hole.

13. The process according to claim 1, wherein the trapped air is removed through a slit formed in an inner wall of at least one of the molds.

14. The process according to claim 13, wherein a through hole is formed in at least one of the molds so as to communicate with said slit.

15. The process according to claim 1, wherein the trapped air is removed through a heat-resistant porous member embedded in an inner wall of at least one of the molds.

16. The process according to claim 15, wherein a through hole is formed in at least one of the molds so as to communicate with said porous member.

17. The process according to claim 2, wherein a through hole is formed in at least one of the molds so as to communicate with said porous member.

18. The process according to claim 1, wherein the skin material is a material selected from the group consisting of woven fabric, non-woven fabric, metal net, thermoplastic resin fiber, paper, metal foil, thermoplastic resin sheet, thermoplastic resin foam, rubber foam and a laminate of at least two layers of said materials; and said resin melt is a resin selected from the group consisting of polypropylene, polyethylene, polystyrene, acrylonitrile-styrene-butadiene copolymer, nylon, ethylene-propylene copolymer and styrene-butadiene copolymer.

19. The process according to claim 3, wherein the trapped air is removed through said pin hole and said heat-resistant porous member.

20. The process according to claim 3, wherein the trapped air is removed through said pin hole and said slit.

21. The process according to claim 3, wherein said pin is attached to a spring or cushioning means.

22. The process according to claim 3, wherein said pin has a diameter of 0.1 to 2 mm.

23. The process according to claim 19, wherein said pin is attached to a spring or cushioning means.

24. The process according to claim 19, wherein said pin has a diameter of 0.1 to 2 mm.

25. The process according to claim 20, wherein said pin is attached to a spring or cushioning means.

26. The process according to claim 20, wherein said pin has a diameter of 0.1 to 2 mm.

27. The process according to claim 3, wherein the skin material is a material selected from the group consisting of woven fabric, non-woven fabric, metal net, thermoplastic resin fiber, paper, metal foil, thermoplastic resin sheet, thermoplastic resin foam, rubber foam and a laminate of at least two layers of said materials; and said resin melt is a resin selected from the group consisting of polypropylene, polyethylene, polystyrene, acrylonitrile-styrene-butadiene copolymer, nylon, ethylene-propylene copolymer and styrene-butadiene copolymer.

28. The process according to claim 19, wherein the skin material is a material selected from the group consisting of woven fabric, non-woven fabric, metal net, thermoplastic resin fiber, paper, metal foil, thermoplastic resin sheet, thermoplastic resin foam, rubber foam and a laminate of at least two layers of said materials; and said resin melt is a resin selected from the group consisting of polypropylene, polyethylene, polystyrene, acrylonitrile-styrene-butadiene copolymer, nylon, ethylene-propylene copolymer and styrene-butadiene copolymer.

29. The process according to claim 20, wherein the skin material is a material selected from the group consisting of woven fabric, non-woven fabric, metal net, thermoplastic resin fiber, paper, metal foil, thermoplastic resin sheet, thermoplastic resin foam, rubber foam and a laminate of at least two layers of said materials; and said resin melt is a resin selected from the group consisting of polypropylene, polyethylene, polystyrene, acrylonitrile-styrene-butadiene copolymer, nylon, ethylene-propylene copolymer and styrene-butadiene copolymer.

30. The process according to claim 4, wherein the trapped air is removed through said mold hole and said heat-resistant porous member.

31. The process according to claim 4, wherein the trapped air is removed through said mold hole and said slit.

32. The process according to claim 4, wherein the skin material is a material selected from the group consisting of woven fabric, non-woven fabric, metal net, thermoplastic resin fiber, paper, metal foil, thermoplastic resin sheet, thermoplastic resin foam, rubber foam and a laminate of at least two layers of said materials; and said resin melt is a resin selected from the group consisting of polypropylene, polyethylene, polystyrene, acrylonitrile-styrene-butadiene copolymer, nylon, ethylene-propylene copolymer and styrene-butadiene copolymer.

33. The process according to claim 30, wherein the skin material is a material selected from the group consisting of woven fabric, non-woven fabric, metal net, thermoplastic resin fiber, paper, metal foil, thermoplastic resin sheet, thermoplastic resin foam, rubber foam and a laminate of at least two layers of said materials; and said reisn melt is a resin selected from the group consisting of polypropylene, polyethylene, polystyrene, acrylonitrile-styrene-butadiene copolymer, nylon, ethylene-propylene copolymer and styrene-butadiene copolymer.

34. The process according to claim 31, wherein the skin material is a material selected from the group consisting of woven fabric, non-woven fabric, metal net, thermoplastic resin fiber, paper, metal foil, thermoplastic resins sheet, thermoplastic resin foam, rubber foam and a laminate of at least two layers of said materials; and said resin melt is a resin selected from the group consisting of polypropylene, polyethylene, polystyrene, acrylonitrile-styrene-butadiene copolymer, nylon, ethylene-propylene copolymer and styrene-butadiene copolymer.

35. The process according to claim 4, wherein said mold hole formed in at least one of the molds has a diameter of 2 to 6 mm and a depth of 11 to 30 mm.

* * * * *